United States Patent [19]

Hiraoka et al.

[11] Patent Number: 4,733,348
[45] Date of Patent: Mar. 22, 1988

[54] VIRTUAL-MEMORY MULTIPROCESSOR SYSTEM FOR PARALLEL PURGE OPERATION

[75] Inventors: Takashi Hiraoka; Toyohiko Matsushita, both of Tokyo, Japan

[73] Assignee: Kabushiki Kaisha Toshiba, Kawasaki, Japan

[21] Appl. No.: 739,156

[22] Filed: May 30, 1985

[30] Foreign Application Priority Data

May 31, 1984 [JP] Japan ................................. 59-111900

[51] Int. Cl.⁴ .......................................... G06F 12/08
[52] U.S. Cl. ................................................... 364/200
[58] Field of Search ... 364/200 MS File, 900 MS File

[56] References Cited

U.S. PATENT DOCUMENTS 3,560,934 2/1971 Ernst et al. ......................... 364/200
4,394,731 7/1983 Flusche et al. ..................... 364/200
4,442,487 4/1984 Fletcher et al. .................... 364/200

Primary Examiner—Gary V. Harkcom
Assistant Examiner—David L. Clark
Attorney, Agent, or Firm—Finnegan, Henderson, Farabow, Garrett & Dunner

[57] ABSTRACT

A virtual memory control multiprocessor system has a plurality of processors each having a translation lookaside buffer (TLB). A purge request source processor commonly supplies a purge request signal to other processors so as to cause them to perform TLB purge operations. A purge end signal sent back from other processors is stored in flip-flops in the source processor in units of processors. The source processor detects the end of TLB purge operations of all processors, in accordance with the statuses of the flip-flops.

2 Claims, 9 Drawing Figures

FIG. 1
(PRIOR ART)
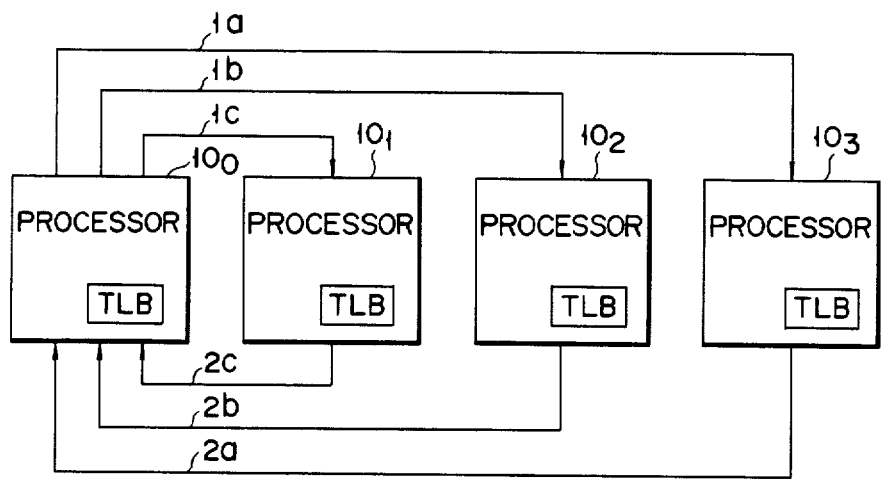
FIG. 2A
(PRIOR ART)
FIG. 2B
(PRIOR ART)
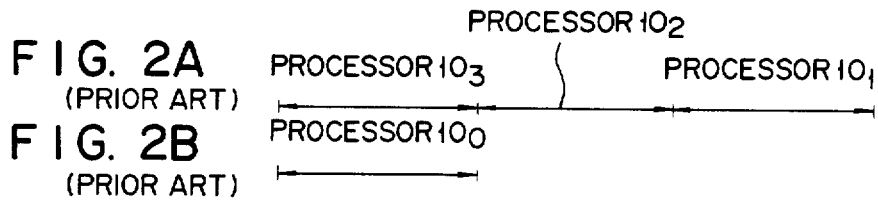
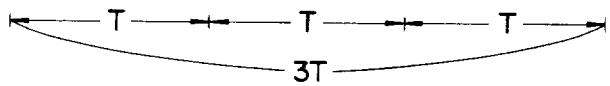

FIG. 5A   PROCESSOR $20_0$
FIG. 5B   PROCESSOR $20_1$
FIG. 5C   PROCESSOR $20_2$
FIG. 5D   PROCESSOR $20_3$

⊢—T—⊣

VIRTUAL-MEMORY MULTIPROCESSOR SYSTEM FOR PARALLEL PURGE OPERATION

BACKGROUND OF THE INVENTION

The present invention relates to a virtual memory control multiprocessor system having a plurality of processors.

In a conventional virtual memory control multiprocessor system of this type, a translation lookaside buffer (to be referred to as a TLB hereinafter) is arranged for each processor to perform address translation from a logical address to a real address at high speed. In a system of this type, purge (initialization) of TLBs of all processors must often be performed to equalize the contents of the TLBs.

As shown in FIG. 1, in a multiprocessor system having processors $10_0$ through $10_3$, assume that the processor $10_0$ supplies a TLB purge request to the processors $10_1$ through $10_3$. For this purpose, the processor $10_0$ supplies a purge request signal $1a$ to the processor $10_3$. The processor $10_3$ performs TLB purge processing in response to the signal $1a$. In this case, the processor $10_0$ performs its own TLB purge processing while the processor $10_3$ performs TLB purge processing. When TLB purge processing of the processor $10_3$ is completed, the processor $10_3$ sends back a purge end signal $2a$ to the processor $10_0$. When the processor $10_0$ receives the signal $2a$ from the processor $10_3$, the processor $10_0$ sends a purge request signal $1b$ to the processor $10_2$. The processor $10_2$ performs TLB purge processing in response to the signal $1b$ and sends back a purge end signal $2b$ to the processor $10_0$. When the processor $10_0$ receives the signal $2b$ from the processor $10_2$, the processor $10_0$ then sends a purge request signal $1c$ to the next processor $10_1$. The processor $10_1$ performs TLB purge processing in response to the signal $1c$ and sends back a purge end signal $2c$ to the processor $10_0$. When the processor $10_0$ receives the signal $2c$ from the processor $10_1$, the processor $10_0$ determines that all TLB purge operations of the processors $10_0$ through $10_3$ are completed.

In the conventional multiprocessor system described above, the TLB purge operations of the processors are sequentially performed. Assume that the time required for a given processor to receive a purge request signal, perform purge processing in response to this signal, and send back a purge end signal to the processor which has supplied the purge request signal thereto is defined as T. In this case, in the system of FIG. 1, the total time for all the TLB purge operations of the four processors $10_0$ through $10_3$ is 3T, as shown in FIG. 2. In a multiprocessor for sequentially performing TLB purge operations, TLB purge time is linearly increased in proportion to the number of processors, resulting in inconvenience.

SUMMARY OF THE INVENTION

It is an object of the present invention to provide a multiprocessor system wherein the total purge time for translation lookaside buffers, with respect to the total processing time of the entire system, can be shortened.

According to the multiprocessor system of the present invention, all the processors including a purge request source processor can perform parallel purge operations. In addition, the end of the purge operation of each processor can be set by a corresponding flip-flop. By checking the statuses of the flip-flops, the end of the purge operations of all the processors can be detected. Therefore, the time for purge operations can be greatly shortened.

In order to achieve the above object of the present invention, there is provided a virtual memory control multiprocessor system having a plurality of processors each having a translation lookaside buffer, including:

purge request signal generating means for supplying a common purge request signal requesting purge operations of translation lookaside buffers of other processors excluding a source processor for generating the common purge request signal which is supplied in parallel to the other processors;

a plurality of flip-flops for storing, in units of processors, a purge end signal sent back from the other processors which complete purge operations in response to the common purge request signal generated from the purge request signal generating means; and purge end detecting means for checking the statuses of the plurality of flip-flops and detecting the end of purge operations of all processors.

BRIEF DESCRIPTION OF THE DRAWINGS

FIG. 1 is a schematic block diagram of a conventional multiprocessor system;

FIGS. 2A through 2B are respectively timing charts for explaining TLB purge operations of all processors shown in FIG. 1;

FIGS. 5A through 5D are respectively timing charts for explaining TLB purge operations of the processors shown in FIG. 3.

DETAILED DESCRIPTION OF THE PREFERRED EMBODIMENT

Figure 3:
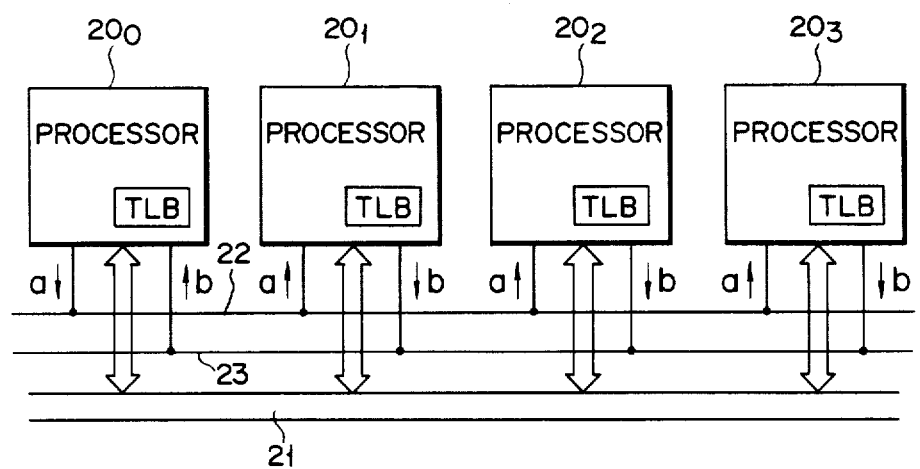
FIG. 3 is a schematic block diagram of a multiprocessor system to which the present invention is applied.

FIG. 3 shows a virtual memory control multiprocessor system according to an embodiment of the present invention. Referring to FIG. 3, processors $20_0$ through $20_3$ have translation lookaside buffers (TLBs), respectively. The processors $20_0$ through $20_3$ are connected to each other through a system bus 21. The processors $20_0$ through $20_3$ receive and send a purge request signal a through a signal line 22 and a purge end signal b through a signal line 23. The lines 22 and 23 shown in FIG. 3 constitute part of the system bus but are separately illustrated for descriptive convenience.

Figure 4:
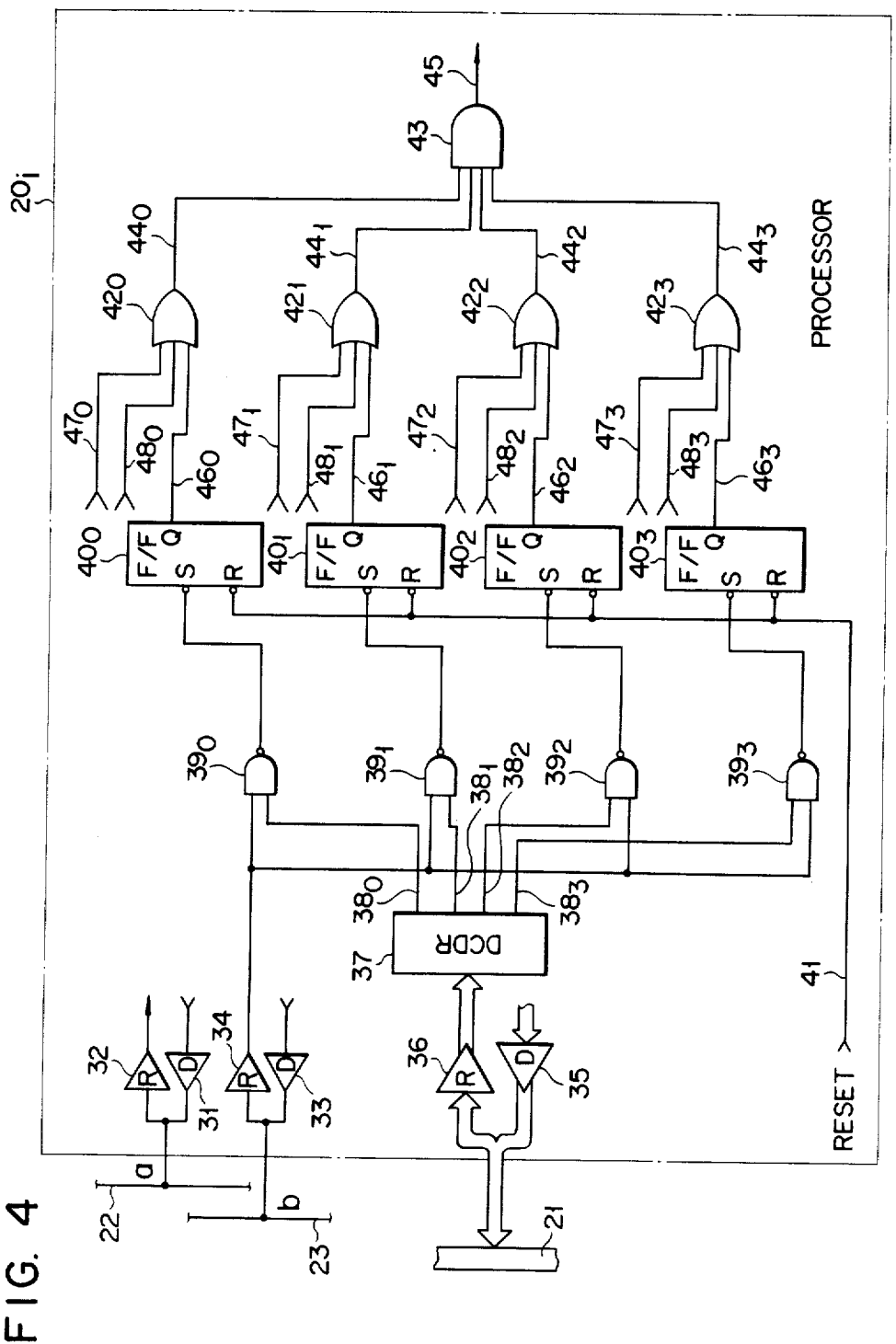
FIG. 4 is a circuit diagram of a circuit of the processor system (FIG. 3) which is directly associated with the present invention.

FIG. 4 shows an arrangement of the processor $20_i$ (i=0 through 3) of FIG. 3 which is directly associated with the present invention. A bus driver 31 sends the signal a onto the line 22. A bus receiver 32 receives the signal a from the line 22. A bus driver 33 sends the signal b onto the line 23. A bus receiver 34 receives the signal b from the line 23. A bus driver 35 sends a processor number including an address to an address bus of the bus 21. A bus receiver 36 receives address data from the address bus of the bus 21. The address data comprises, for example, a processor number, a command and auxiliary data. The signal b is included in the command.

A decoder 37 decodes a predetermined field (i.e., processor number) of the address fetched by the receiver 36. Decode signal lines $38_0$ through $38_3$ correspond to processor numbers of the processors $20_0$ through $20_3$, respectively. Each of the lines $38_0$ through $38_3$ is connected to one input terminal of a corresponding one of 2-input NAND gates $39_0$ through $39_3$. The signal b is supplied to the other input terminal of each of the NAND gates $39_0$ through $39_3$ through the receiver 34. Output signals from the NAND gates $39_0$ through $39_3$ are supplied to set input terminals S of R-S flip-flops $40_0$ through $40_3$, respectively. A signal 41 is supplied to a reset input terminal R of each flip-flop $40_i$ (i=0 through 3) to reset it. Q outputs from the flip-flops $40_i$ are supplied to 3-input OR gates $42_0$ through $42_3$, respectively. The OR gates $42_0$ through $42_3$ also receive signals $47_0$ through $47_3$ representing that the processors generating the signals a are the processors $20_0$ through $20_3$ and signals $48_0$ through $48_3$ representing that the processors $20_0$ through $20_3$ are not present. Outputs from the OR gates $42_0$ through $42_3$ are supplied to a 4-input AND gate 43. An output signal 45 from the AND gate 43 is used as the purge end signal which is received by the processor which has generated the signal a.

The operation of the multiprocessor system of this embodiment will be exemplified wherein the processor $20_0$ sends the TLB purge request signal a to the remaining processors $20_1$ through $20_3$, as shown in FIG. 3, with reference to the timing charts of FIGS. 5A through 5D.

The processor $20_0$ supplies the signal a onto the line 22 through the driver 31 in the processor $20_0$. The signal a on the line 22 is commonly supplied to the processors $20_1$ through $20_3$ and is fetched thereby through the corresponding bus receivers 32 in the processors $20_1$ through $20_3$. The TLB purge operations are simultaneously performed in response to the signal a commonly fetched by the processors $20_1$ through $20_3$, as shown in FIGS. 5A through 5D. The TLB purge operation of the source processor $20_0$ is also performed while the processors $20_1$ through $20_3$ perform the corresponding TLB purge operations after the processor $20_0$ sends the signal a thereto.

When the processors $20_1$ through $20_3$ complete the TLB purge operations, they send back the signals b onto the line 23 through the corresponding bus drivers 33 if the bus 21 is available. In this case, the processors $20_1$ through $20_3$ send their own processor numbers onto the address bus of the bus 21 through the corresponding bus drivers 35. The processor number data on the system bus 21 are supplied to the decoder 37 in the source processor $20_0$. The decoder 37 decodes the processor numbers supplied through the receivers 36. When the processor number data supplied to the decoder 37 of the processor $20_0$ represents that from the processor $20_1$, the decoder 37 sends an active signal of logic "1" onto the signal line $38_1$. This signal is supplied to one input terminal of the NAND gate $39_1$. The other input terminal of the NAND gate $39_1$ receives the signal b sent from the processor $20_1$ through the line 23 and the corresponding receiver 34. The NAND logic of the NAND gate $39_1$ in the processor $20_0$ is established, and an output signal therefrom goes from logic "1" to logic "0". This transition indicates that the signal b from the processor $20_1$ is detected by the NAND gate $39_1$.

The output signal from the NAND gate $39_1$ is supplied to the set terminal S of the flip-flop $40_1$. The flip-flop $40_1$ is set when the output signal from the NAND gate $39_1$ is inverted from logic "1" to logic "0" and the set input terminal of the flip-flop $40_1$ is inverted from logic "0" to logic "1". In other words, the flip-flop $40_i$ stores the purge end signal sent from the processor $20_1$. The above operation can also be applied when the signals b and the corresponding processor numbers are sent from the processors $20_2$ and $20_3$. More particularly, when the processor $20_2$ supplies the signal b and its own processor number to the processor $20_0$ through the line 23 and the bus 21, the flip-flop $40_2$ in the source processor $20_0$ is set. Similarly, when the processor $20_3$ supplies the signal b and its own processor number through the line 23 and the bus 21 to the processor $20_0$, the flip-flop $40_3$ in the source processor $20_0$ is set.

When the flip-flops $40_1$ through $40_3$ are set, their Q output signals $46_1$ through $46_3$ go from logic "0" to logic "1". The Q output signals $46_1$ through $46_3$ are supplied to the OR gates $42_1$ through $42_3$, respectively. As a result, the OR gates $42_1$ through $42_3$ are rendered conductive, and their output signals $44_1$ through $44_3$ go from logic "0" to logic "1", respectively.

Since the processor $20_0$ serves as the TLB purge request source processor, it does not generate the signal b and its own processor number. As a result, the flip-flop $40_0$ in the processor $20_0$ is kept reset, and the Q output signal of logic "0" therefrom is supplied to the OR gate $42_0$. Other terminals of the OR gate $42_0$ receive the signal $47_0$ representing that the processor generating the signal a is the processor $20_0$ and the signal $48_0$ representing that the processor $20_0$ is not present. In this embodiment, since the processor $20_0$ serves as the TLB purge request source processor, the signal $47_0$ of logic "1" is supplied to the OR gate $42_0$. As a result, the output signal $44_0$ from the OR gate $42_0$ is set at logic "1".

The output signals $44_0$ through $44_3$ from the OR gates $42_0$ through $42_3$ are supplied to the AND gate 43. The AND gate 43 generates a signal of logic "1" when all the signals $44_0$ through $44_3$ are set at logic "1". As a result, the TLB purge request source processor $20_0$ checks the output signal 45 from the AND gate 43. When this signal is set at logic "1", the processor $20_0$ determines that all the TLB purge operations of the processors $20_0$ through $20_3$ are completed, thereby initiating the next operation.

The above operation can be performed when all the processors $20_0$ through $20_3$ are present. However, when the processor $20_3$ is not present, the following operation is performed. The signal $48_3$ representing that the processor $20_3$ is not present is set at logic "1". The signal $48_3$ of logic "1" is supplied to the OR gate $42_3$. The OR gate $42_3$ supplies the dummy TLB purge end signal to the AND gate 43. If the processor $20_3$ is not present, the processor $20_0$ can detect that all the TLB purge operations of the processors $20_0$ through $20_2$ are completed.

In the above embodiment, the maximum number of processors is four. However, the present invention can be applied to a multiprocessor system having any number of processors.

In the above embodiment, the purge request signal transfer signal line 22 and the purge end signal transfer signal line 23 are arranged. However, these signal lines can be omitted. For example, a purge request code corresponding to the signal a and a purge end code corresponding to the signal b can be provided, and these code data can be transferred through a predetermined field of the address bus in the bus 21. In this case, each processor must have decoding means for decoding the purge request code and the purge end code.

What is claimed is:

1. A virtual-memory-type multiprocessor system having a plurality of processors each having a translation lookaside buffer, comprising:

a first processor having a purge request signal generating means for supplying a common purge request signal requesting purging of translation lookaside buffers of said other processors;

a plurality of flip-flops provided in each of said plurality of processors each of said flip-flop for storing a corresponding purge end signal, for each of said plurality of processors, each of said other processors, upon completion of purge operations in response to the common purge request signal, sending a corresponding processor number to each other processor; each of said processors further comprising: a decoder for decoding each processor number sent and setting the flip-flop corresponding to the decoded processor number; and purge end detecting means connected to each of said plurality of flip-flops for detecting the end of the purging of all processors.

2. A system according to claim 1, wherein said purge end detecting means comprises:

first gates, respectively connected to said flip-flops, for receiving output signals therefrom, a signal indicating said source processor, and a signal indicating absence of any one of said processors from said multiprocessor system, and for outputting the logical sum of all input signals; and a second gate connected to each of said first gates for outputting the logical product of all the output signals from said first gates.

* * * * *